United States Patent

Swartz et al.

[15] 3,646,394
[45] Feb. 29, 1972

[54] ACYCLIC GENERATOR WITH VACUUM ARC COMMUTATOR FOR RAPID GENERATION OF SHORT, HIGH-ENERGY PULSES

[72] Inventors: Paul S. Swartz; Willem F. Westendorp, both of Schenectady, N.Y.

[73] Assignee: General Electric Company

[22] Filed: Nov. 19, 1970

[21] Appl. No.: 91,127

[52] U.S. Cl.................315/205, 310/126, 310/148, 310/178, 310/268, 315/226, 315/240, 315/330
[51] Int. Cl..............H02k 29/02, H02k 31/02, H05b 41/34
[58] Field of Search............315/200 A, 205, 226, 240, 330; 310/126, 148, 178, 268

[56] References Cited

UNITED STATES PATENTS

| | | |
|---|---|---|
| 3,334,270 | 8/1967 | Nuckolls................315/240 X |
| 3,443,134 | 5/1969 | Dowsett et al................310/178 |
| 3,497,739 | 2/1970 | Appleton................310/178 |
| 3,586,894 | 6/1971 | Mueller................310/178 |

*Primary Examiner*—Robert Segal
*Assistant Examiner*—Siegfried H. Grimm
*Attorney*—John F. Ahern, Paul A. Frank, Richard R. Brainard, Jerome Squillaro, Frank L. Neuhauser, Oscar B. Waddell and Joseph B. Forman

[57] ABSTRACT

Short pulses of high energy are generated at a high-pulse rate by providing high energy from an acyclic generator having a plurality of discs rotating in the field of a superconductive field coil and commutating the output of the generator, through an electric discharge device connected across the same, by means of a pair of oppositely poled, sequentially operated triggerable vacuum arc devices.

13 Claims, 2 Drawing Figures

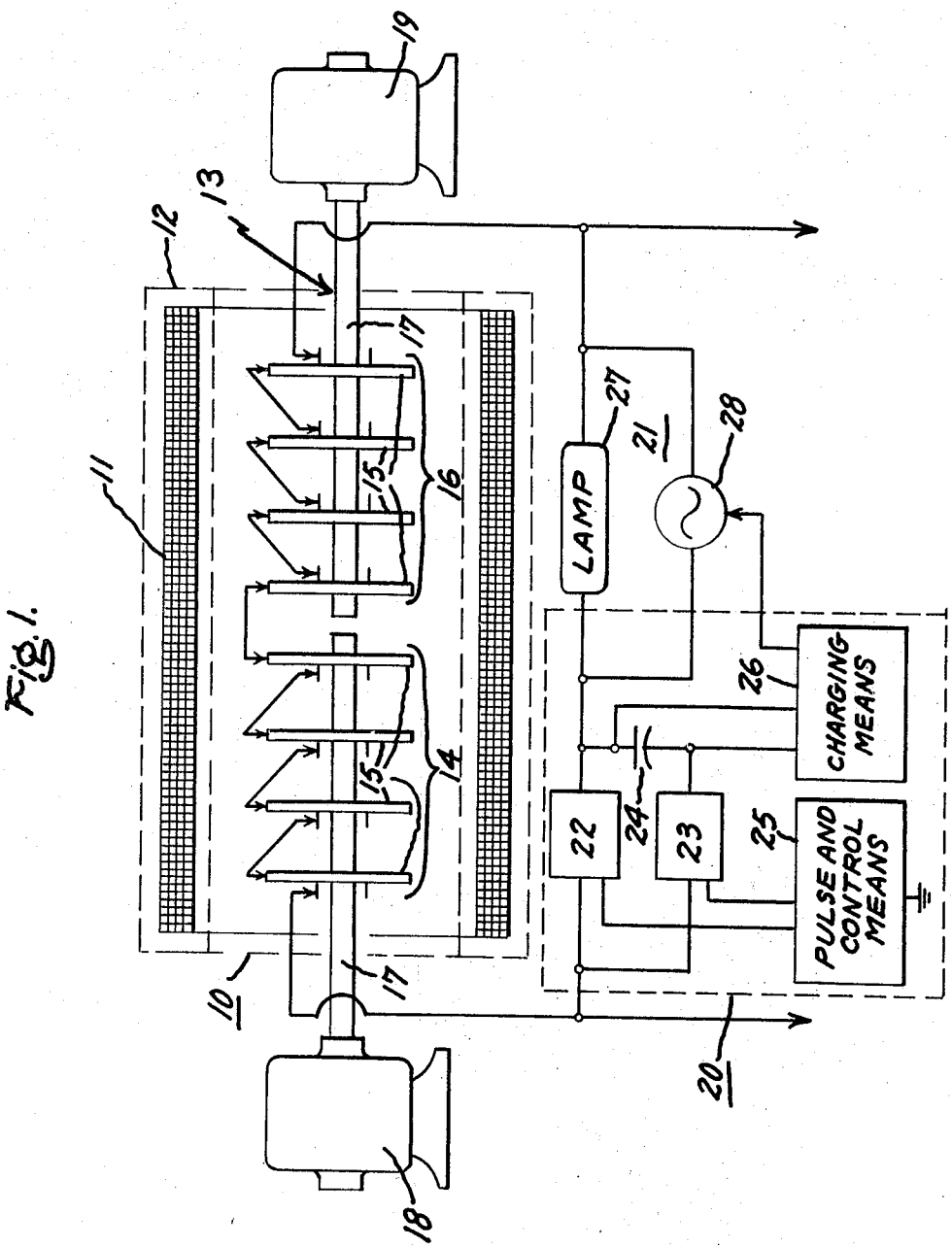

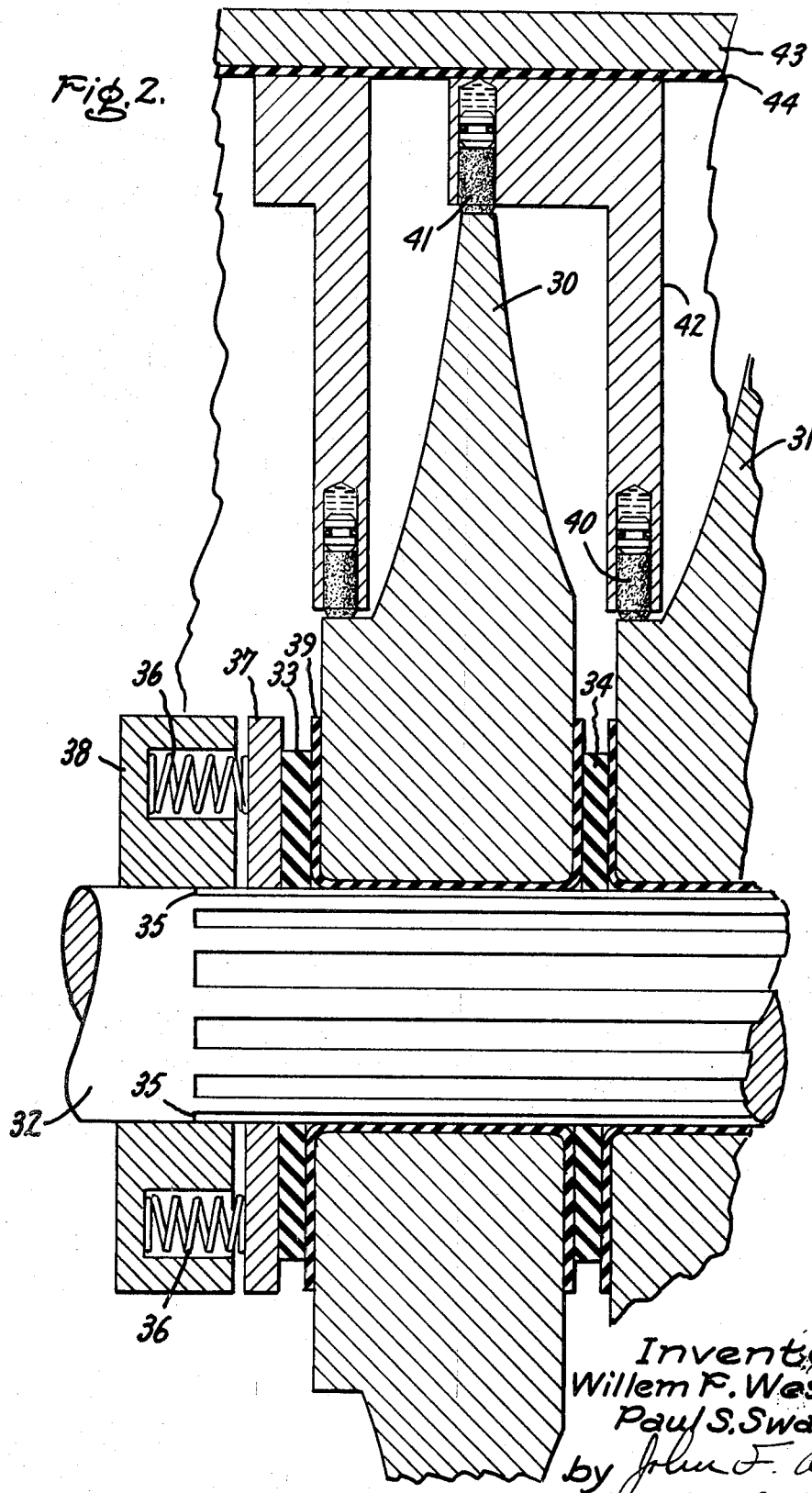

3,646,394

ACYCLIC GENERATOR WITH VACUUM ARC COMMUTATOR FOR RAPID GENERATION OF SHORT, HIGH-ENERGY PULSES

The present invention relates to apparatus and methods of generating short pulses of high energy. More particularly, the invention is directed to the repetitive production and utilization of such pulses without the limitations imposed by conventional energy generating and switching means of the prior art.

In the electrical arts, there are many instances in which short, high-energy pulses of electric power are required. Such uses include the production of power supplies for high-power electron devices, for radio transmitters, radio telescopes, and the like. Similarly, the illumination arts require high-energy sources for many specialized uses such as for high-power flash lamps, for photography, and for visual navigation aids such as, for example, beacons and light ships.

There are many problems associated with presently available high-energy sources, such as capacitors, inductive reactors, and the like, Generally, such reactances capable of producing high-energy pulses are very cumbersome and are heavy and occupy a large amount of space. Another problem, generally found in high-energy reactors, is that once energy has been supplied thereto, getting energy therefrom involves an intricate, so far, insoluble switching problem. Due to the problems of switching, the speed with which such devices may be operated is relatively limited and, in addition to the energy lost in switching, there is a limitation upon frequency of operation which cannot be exceeded. Generally, as the speed of the pulse rate required by the application increases, such problems also increase, rendering the production of high-energy, high pulse rate energy sources of the prior art totally unsatisfactory.

Accordingly, it is an object of the invention to provide apparatus and methods for producing and switching high-energy electrical pulses at a rapid pulse rate with a minimum of difficulty and with simplicity and minimal losses.

Another object of the invention is to provide apparatus and methods for producing pulsed high-energy electric signals without mechanical switching thereof.

Still another object of the invention is to provide for high-energy, high-speed excitation of electric discharge lamps.

Briefly stated, in accord with one embodiment of the present invention, the foregoing objectives are achieved by providing a high-energy source in the form of an acyclic generator utilizing a superconductive field coil. The high energy of the acyclic generator is commutated through a load device such as an electric discharge flash lamp which is connected thereacross, by an array of oppositely poled, parallel connected, triggerable vacuum arc devices in series circuit with the load. The commutation of the high-energy source is accomplished by electron means in the substantial absence of mechanical switching, particularly of high currents and voltages, and may be done with substantially no energy losses and with very high speed.

The novel features believed characteristic of the invention are set forth in the appended claims. The invention itself, together with further objects and advantages thereof, may best be understood by referring to the following detailed description, taken in connection with the attached drawings in which:

FIG. 1 is a schematic illustration of apparatus for producing rapidly pulsed high energy according to the invention and including an acyclic generator, and, FIG. 2 is a partial vertical cross-sectional view, with parts broken away, of one current generating disc of an acyclic generator, illustrated schematically in FIG. 1.

In FIG. 1, the invention is illustrated schematically as including an acyclic generator represented generally at 10 with a commutation circuit 20 and a load circuit 21 connected across the output thereof. Acyclic generator 10 comprises a superconductive field coil 11 contained in thermal isolation means represented by dotted line boxes 12 surrounding the constituents thereof and generally including a dewar arrangement of thermal containers for containing liquid helium at a temperature of 4.2° K. absolute. At such temperature, the resistance of the material from which the superconductive coil is wound, generally $Nb_3Sn$, $NbTi$ or, such a type II superconductive material, falls essentially to zero and conductivity without resistance is obtained, thus making possible the attainment of exceedingly high-current densities, and consequently, high-flux densities with a moderate voltage supply. An acyclic generator with a superconductive field coil is described, for example, in U.S. Pat. No. 3,443,134.

A rotor assembly 13 is located within field coil 11. Rotor assembly 13 includes a first bank 14 of a plurality of rotatable discs 15, each of which is capable of producing a very high current under the influence of the field of field coil 11. First bank 14 of discs 15 is adapted to rotate in a first direction, say clockwise. A second bank 16 of a plurality of discs 15 equal in number to the number of discs 15 in bank 14, are adapted to rotate in an opposite direction, say, counterclockwise. Discs 15 of bank 14 are mounted upon a torque shaft 17 and are connected to a first motive means 18 which may, for example, comprise a gas turbine or other high-speed source of rotational motive power. Similarly, bank 16 of discs 15 are mounted upon a second torque shaft 17 and are adapted to rotate in an opposite direction, moved by a second source 19 of rotational motive power, which may be a similar device to motive means 18. All of discs 15 are connected electrically in series by a plurality of brushes (not shown) and the output thereof is applied to the commutation circuit 20 and load circuit 21 in series relationship.

The commutation and load circuits in essence, comprise a pair of parallel connected triggerable vacuum arc devices 22 and 23, preferably triggerable vacuum gap devices, and an electric discharge device, for example, represented generally by electric discharge lamp 27, in series circuit arrangement. More specifically, first triggerable vacuum gap device 22 is in series with lamp 27 and second triggerable vacuum gap device 23 is in series circuit with a capacitor 24, both of which are in parallel circuit relationship with triggerable vacuum gap device 22. A preionizing source of electric potential, represented schematically by generator 28, is disposed across lamp 27 to provide for a level of ionization such as to render the environment within lamp 27 electrically conductive prior to the commutation of the high-energy therethrough. Commutation means 20, in addition to triggerable vacuum gaps 22 and 23 and capacitor 24, includes a pulse and control means 25 which may conveniently include a high-frequency oscillator or generator of a square wave or sawtooth wave of voltage and switching means for switching a sufficiently high-voltage triggering pulse, which may be from several hundred to several thousand volts, sufficient to cause triggerable vacuum gap devices 22 and 23 to fire at predetermined and sequential times in the operation of the commutation system. Charging means 26 is provided in parallel with capacitor 24 and need only be a simple voltage generator, as for example, a battery or other suitable means for imposing a unidirectional potential across capacitor 24 at a predetermined time in sequence with the pulse and control means 25. Triggerable vacuum gap devices 22 and 23 should be identical and may, for example, be triggered vacuum gaps such as that disclosed and claimed in Lafferty U.S. Pat. No. 3,087,092.

In the operation of the system as illustrated in FIG. 1, the superconductive field coil is properly cooled and the acyclic generator is caused to be operative by applying actuating voltages to the field coil and causing the motive means 18 and 19 to be operative to rotate banks 14 and 16 of discs 15 in respective clockwise and counterclockwise directions, or vice versa. The generator remains in operation throughout the switching cycles. The sequence of operation during switching is controlled by pulse and control means 25. PUlse and control means 25, in addition to sources for generating and means for switching the appropriate voltages to cause actuation of triggerable vacuum gap devices 22 and 23, for charging capacitor 24 and for operation of preionizing means 28, may conveniently include a suitably programmable control means as for example, an information and storage device such as a digital computer for insuring proper and sequential operation of the various components, as described below.

The following sequence of operation is followed in accord with the present invention: preionizing means 28 is actuated. Capacitor 24 has been previously charged from means 26. Preionization means 28 is actuated to cause a condition of preionization of the environment within lamp 27. While this condition of preionization exists, means 25 causes a pulse of triggering voltage to be supplied to triggerable vacuum gap device 22, providing a conductive path through lamp 27 between the output terminals of the acyclic generator. An exceedingly high-current, high-voltage pulse representing the full output of the acyclic generator, limited only by the vacuum gap, lamp, and connection impedances momentarily flows through device 22 and lamp 27, causing the initiation of an exceedingly bright pulse of light from lamp 27. Upon the initiation of the pulse to trigger vacuum gap device 22, the preionization means 28 is deenergized.

The next step, is the controlled discharge of capacitor 24. The polarity of the voltage with which capacitor 24 is charged is such as will cause, upon the discharge thereof through triggerable vacuum gap device 22, a current which is of opposite direction to the current through the main line between the output terminals of the acyclic generator. Approximately one pulse width after firing of gap device 22, pulse and control means 25 transmits a suitable pulse of voltage to triggerable vacuum gap 23 to cause it to become conductive. Capacitor 24 discharges through triggerable vacuum gap device 23 and the discharge current loop, including both gap devices, causes a current through triggerable vacuum gap device 22 which exactly neutralizes the current from the generator, causing zero net current through triggerable gap device 22, which deionizes and becomes nonconductive. The current through the lamp is not extinguished immediately, however, because the main current from generator 10 passes momentarily through the ionized triggerable vacuum gap device 23, which is still ionized, for a sufficient period of time to reverse the charge of capacitor 24. Upon the reverse charging of capacitor 24 to its maximum charge through triggerable vacuum gap device 23, current through the lamp 27 is terminated, and one cycle has been completed. Gap device 23 is then deionized and becomes nonconductive. Upon the completion of the cycle, the program begins once again after recharging of the capacitors, with preionization of the lamp, firing of the first triggerable vacuum gap to initiate a pulse and firing of the second triggerable vacuum gap device to terminate a pulse.

Since all of the operations in the foregoing sequence are conducted without mechanical switching of any high current or high voltage, but only of triggering or control voltages, which may also be done electronically with solid-state devices, the system of FIG. 1 may operate at very high speed and without losses or deterioration of electrodes or the like.

Assuming that the plurality of current generating discs 15 are each required to produce a voltage of at least 500 volts, this may be accomplished utilizing individual discs of approximately 24 inches in diameter, since a field of approximately 80 kilogauss at a rotational speed of 19,100 r.p.m. is sufficient to provide the necessary interaction to produce such voltage. A single pulse of approximately 4,000 volts at 100,000 amperes for approximately 250 microseconds removes approximately 100,000 joules from the generator. This imposes a severe mechanical stress upon the acyclic generator. Additionally, the mere rotation of the rather massive discs upon the shaft also imposes severe mechanical strain and causes gyroscopic forces, unless neutralized. It is for this reason that half the individual discs 15 are mounted on one torque shaft and rotate in a first direction while the other half of the discs 15 are mounted upon a second torque shaft and rotate in an opposite direction. This eliminates the gyroscopic forces and also tends to minimize the mechanical stress when a very large amount of energy is extracted from the generator. The structure of the generator must nevertheless, be carefully designed to compensate for the torques and forces attendant such extraction.

FIG. 2 of the drawings illustrate a partial cross-sectional view of a portion of the torque assembly of the acyclic generator of FIG. 1 which shows the manner in which such torques may be handled. In FIG. 2, a pair of discs 30 and 31 having large central thicknesses and reduced peripheral thicknesses wherein the taper may, for example, be limited to the external 60 percent of the diameter thereof and may be along inverse hyperbolic curves, are mounted upon torque shaft 32. Mounting of the discs upon the torque shaft is not rigid, but is accomplished, for example, by a pair of splined rings 33 and 34 at either end of disc 30 rigidly interconnected with the slots 35 in shaft 32 and mechanically bound, in axially slippable connection, with disc 30 by means of spring pressure applied by springs 36 against pressure plate 37 from spring mount 38. An insulator 39 completely surrounds the periphery of the internal portion of disc 30 in the vicinity of the mounting arrangement.

When an energy containing pulse is extracted from the generator, assuming the discs weigh 90 kilograms each and have a total kinetic energy of 64,000,000 joules, the extraction of 100,000 joules causes a decrease in rotational velocity of 1/1280th in 250 microseconds. Although this is a relatively small change in velocity, sufficient slippage must be permitted so that the torque may be absorbed by the machine. This is adequately provided by the spring pressure between the splined discs on the splined shaft and the slippable charge generating discs 30 and 31, as illustrated herein.

Energy is extracted from the discs by means of brushes 40 and 41 which serially connect discs 30 and 31 through brush holder 42. Means are provided to supply pressure to the brushes only during that portion of the operating cycle in which the energy is being extracted. Such means may conveniently be a pressure actuating system which is sequentially controlled by pulse and control means 25.

The discs 30 and 31 may conveniently be fabricated from a beryllium alloy or a special alloy steel which has the mechanical strength to withstand the tensile stresses generated by rotation at approximately 19,000 to 20,000 r.p.m. Thus, assuming an angular velocity of 2,000 radians per second, the tensile strength required may be between 100,000 and 200,000 p.s.i. The pulsed torque reaction during the generation of high-energy pulses in accord with the invention may cause the existence of torques of approximately 800 times the average torque of the motive means to exist within the mechanical portion of the acyclic generator during operation. As is mentioned hereinbefore, a device having the dimensions illustrated herein may, utilizing eight discs in series, generate 4,000 volts, 100,000 ampere pulses of 250 microseconds with a pulse repetition rate of approximately 5 pulses per second for up to 10 minutes of operation, without seriously causing detrimental effects to any of the constituents of the system.

No torque is imposed upon the superconductive coil during operation. The torques generated in the rotating parts of the acyclic generator are counteracted by torques upon the stationary brush support cylinder 42 and its mounting cylinder 43. Cylinder 43 is in mechanical contact with all stationary stationary discs 42 but is electrically isolated therefrom by insulator 44.

By the foregoing, we have disclosed an improved system and method for the generation of high-energy pulses of electric energy at very high speeds and for very short time duration for the operation of electrical, electronic and illuminating devices. Very high-voltages and very high-currents for very short periods of time may be generated and switched due to the absence of all mechanical switching at high voltage and/or high currents and complete control of the sequence of operation.

While the invention has been set forth herein with respect to certain specific examples and particular embodiments, many modifications and changes will immediately occur to those skilled in the art. Accordingly, we intend by the appended claims, to cover all such modifications and changes as fall within the true spirit and scope of the foregoing disclosure.

What we claim as new and desire to secure by Letters Patent of the United States is:

1. Apparatus for repetitively producing high-energy electric pulses of very short time duration and comprising:
    a. an acyclic generator adapted to generate and transfer a charge of 1,000 joules of energy;
    b. an electric discharge load device switchably connected across the output of said acyclic generator;
    c. means in circuit with said load device for preionizing said device to render it electrically conductive;
    d. a first triggerable vacuum arc device in series with said load device and operative when rendered conductive to connect said load device directly across said acyclic generator, and;
    e. a second triggerable vacuum arc device and a capacitor in parallel circuit relation with said first triggerable vacuum arc device, said second triggerable vacuum arc device being operative when rendered conductive to neutralize the effect of said first triggerable vacuum arc device being operative and thereby disconnect said load device from said acyclic generator.

2. The apparatus of claim 1 wherein said acyclic generator includes a plurality of current generating discs rotatably mounted within a superconductive field coil and serially connected.

3. The apparatus of claim 2 wherein said discs are divided into a first group which are rotated clockwise by a first rotational motive means and a second group which are rotated counterclockwise by a second rotational motive means.

4. The apparatus of claim 1 wherein said first triggered vacuum arc device is poled to conduct with a first polarity, and said second triggerable vacuum arc device is poled to discharge said capacitor with a second polarity to achieve zero net current through said first triggerable vacuum arc device when both of said devices are in the operative condition.

5. High-energy, short time duration, repetitive pulse apparatus for electric lamp operation comprising:
    a. an acyclic generator adapted to generate an energy change of in excess of 100,000 joules;
    b. an electric discharge lamp switchably connected across the output of said acyclic generator;
    c. means across said lamp for preionizing the same and rendering it conductive;
    d. a first triggerable vacuum arc device connected in series with said lamp and adapted to connect said lamp across said acyclic generator once said lamp is preionized; and
    e. a chargeable capacitor and a second triggerable vacuum arc device connected in parallel circuit relationship with said first triggerable vacuum arc device and operative when actuated to discharge said capacitor and neutralize the effects of said first triggerable vacuum arc being conductive and disconnect said acyclic generator from said electric lamp.

6. The apparatus of claim 5 wherein said acyclic generator includes a plurality of charge accummulating discs rotatably mounted within a superconducting field coil and serially connected.

7. The apparatus of claim 6 wherein said discs are separated into a first group which are rotated in a clockwise direction by a first rotational motive means and a second group are rotated in a counterclockwise direction by a second rotational motive means.

8. The apparatus of claim 5 wherein said first triggered vacuum arc device is poled to conduct with a first polarity, and said second triggerable vacuum arc device is poled to discharge said capacitor with a second polarity to achieve zero net current through said first triggerable vacuum arc device when both of said devices are in the operative condition.

9. The apparatus of claim 7 wherein said apparatus further includes control means to repetitively:
    a. preionize said lamp;
    b. fire said first triggerable vacuum arc device to discharge a quantity of charge from said acyclic generator through said lamp that is limited primarily by the internal resistance of said triggerable vacuum arc device and said lamp and by contact resistances to cause high-energy energization of said lamp;
    c. deactivate said preionization means;
    d. activate said second triggerable vacuum gap device to discharge said capacitor and disconnect said acyclic generator from said lamp to thereby extinguish said lamp.

10. The apparatus of claim 9 wherein said control means is operative to render said lamp activated for a period of approximately 250 microseconds and to repeat said sequence at a rate of approximately 5 such pulses per second.

11. Apparatus for repetitively producing high-energy electric pulses of very short time duration and comprising:
    a. an acyclic generator adapted to generate and transfer an energy of in excess of 100,000 joules and including:
        $a_1$. means for rotating a first bank of current generating discs upon first shaft in a clockwise direction,
        $a_2$. means for rotating a second bank of current generating discs upon a second shaft in a counterclockwise direction,
        $a_3$. means connecting all of said discs of said banks electrically in series to provide an electrical output circuit, and
        $a_4$. a superconductive field coil; and
    b. a load and a commutation means in series circuit across said output circuit,
        $b_1$. said commutation means including a plurality of electric discharge devices for establishing and interrupting a closed circuit across said output circuit, and
        $b_2$. means for sequentially operating said electron discharge devices to deliver short pulses of high energy to said load.

12. The apparatus of claim 11 wherein said means for connecting said rotatable discs in series circuit comprises a plurality of stationary discs interposed therebetween and electrically connected thereto by a plurality of slidable electrical contacts.

13. The apparatus of claim 12 wherein said stationary discs are mechanically affixed to a cylindrical torque tube adapted to absorb equal and opposite torques from stationary discs associated respectively with said bank of clockwise rotating and said bank of counterclockwise rotating discs and transmit zero net torque exterior thereof.

* * * * *